(12) United States Patent
Hill et al.

(10) Patent No.: US 11,899,250 B2
(45) Date of Patent: Feb. 13, 2024

(54) FLEXIBLE OPTICAL FIBER CONNECTORS AND ASSEMBLIES

(71) Applicant: Clearfield, Inc., Minneapolis, MN (US)

(72) Inventors: John P. Hill, Oak Grove, MN (US); Brian Larson, Andover, MN (US); Jeffrey Gniadek, Otisfield, ME (US); David J. Johnsen, Plymouth, MN (US); James John Henschel, Chula Vista, CA (US); Matthew John Brigham, Charlton, MA (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 17/822,774

(22) Filed: Aug. 27, 2022

(65) Prior Publication Data

US 2022/0413230 A1 Dec. 29, 2022

Related U.S. Application Data

(62) Division of application No. 16/897,587, filed on Jun. 10, 2020, now Pat. No. 11,435,534.

(60) Provisional application No. 62/859,828, filed on Jun. 11, 2019.

(51) Int. Cl.
    *G02B 6/38* (2006.01)
(52) U.S. Cl.
    CPC ......... *G02B 6/3893* (2013.01); *G02B 6/3825* (2013.01); *G02B 6/3831* (2013.01); *G02B 6/3897* (2013.01)
(58) Field of Classification Search
    CPC ...... G02B 6/3893; G02B 6/3825; G02B 6/38; G02B 6/9738

USPC .......................................................... 385/78
See application file for complete search history.

(56) References Cited

U.S. PATENT DOCUMENTS

| | | | | |
|---|---|---|---|---|
| 4,880,291 A | * | 11/1989 | Aberson, Jr. | ...... G02B 6/38875 385/55 |
| 5,073,045 A | * | 12/1991 | Abendschein | ....... G02B 6/4246 385/90 |
| 5,147,209 A | * | 9/1992 | Litwin | ................... H05K 1/141 439/70 |
| 5,394,503 A | * | 2/1995 | Dietz, Jr. | ............. G02B 6/3895 385/139 |
| 5,715,348 A | * | 2/1998 | Falkenberg | .......... G02B 6/4452 385/135 |
| 5,765,198 A | * | 6/1998 | McCrocklin | ........... G11C 29/88 711/170 |
| 5,857,860 A | * | 1/1999 | Silliman | ................ H01R 24/46 348/E7.053 |
| 5,857,861 A | * | 1/1999 | Silliman | ................ H04N 7/104 348/E7.053 |

(Continued)

*Primary Examiner* — Kaveh C Kianni
(74) *Attorney, Agent, or Firm* — Troutman Pepper Hamilton Sanders LLP

(57) ABSTRACT

A flexible optical fiber connector comprises a first housing component configured to couple to a terminating connector, and a second housing component configured to receive an optical fiber for termination in the terminating connector. The first housing component and the second housing component are further configured to receive a pushable connector therethrough. A flexible optical fiber connector assembly comprises a flexible connector and a terminating connector coupled thereto. The flexible connector assembly is configured to couple to an adapter held by a holder coupled to a port.

9 Claims, 24 Drawing Sheets

(56) References Cited

U.S. PATENT DOCUMENTS

| | | | | |
|---|---|---|---|---|
| 5,909,063 A * | 6/1999 | Silliman | H01R 24/46 | 200/51.07 |
| 5,909,298 A * | 6/1999 | Shimada | G02B 6/4277 | 398/164 |
| 6,002,331 A * | 12/1999 | Laor | G02B 6/3807 | 340/687 |
| 6,041,374 A * | 3/2000 | Postman | G06F 3/00 | 710/52 |
| 6,179,475 B1 * | 1/2001 | Takamatsu | G02B 6/3897 | 385/88 |
| 6,375,362 B1 * | 4/2002 | Heiles | G02B 6/3897 | 385/55 |
| 6,459,175 B1 * | 10/2002 | Potega | B60L 53/11 | 307/132 M |
| 6,757,753 B1 * | 6/2004 | DeKoning | G06F 3/061 | 710/36 |
| 6,971,895 B2 * | 12/2005 | Sago | G02B 6/3895 | 439/916 |
| 7,914,343 B2 * | 3/2011 | Alexander | H01R 31/06 | 439/669 |
| 9,039,293 B2 * | 5/2015 | Hill | G02B 6/3897 | 385/77 |
| 9,664,862 B2 * | 5/2017 | Lu | G02B 6/3888 | |
| 10,151,887 B2 * | 12/2018 | de Jong | G02B 6/443 | |
| 10,359,577 B2 * | 7/2019 | Dannoux | G02B 6/3841 | |
| 10,386,584 B2 * | 8/2019 | Rosson | G02B 6/3879 | |
| 10,429,595 B2 * | 10/2019 | Van Baelen | G02B 6/4446 | |
| 10,545,305 B2 * | 1/2020 | Leeman | G02B 6/4454 | |
| 10,976,513 B2 * | 4/2021 | Allen | G02B 6/443 | |
| 2001/0049221 A1 * | 12/2001 | Abbott | H01R 12/7005 | 439/488 |
| 2002/0064349 A1 * | 5/2002 | Ngo | G02B 6/4277 | 385/53 |
| 2002/0067894 A1 * | 6/2002 | Scanzillo | G02B 6/3861 | 385/86 |
| 2002/0081076 A1 * | 6/2002 | Lampert | G02B 6/3895 | 385/72 |
| 2002/0146033 A1 * | 10/2002 | Benayoun | H04L 49/351 | 370/465 |
| 2003/0002808 A1 * | 1/2003 | Lampert | G02B 6/3895 | 385/70 |
| 2004/0052471 A1 * | 3/2004 | Colombo | G02B 6/3895 | 385/53 |
| 2004/0054761 A1 * | 3/2004 | Colombo | G02B 6/3897 | 340/5.2 |
| 2005/0100033 A1 * | 5/2005 | Arndt | H04L 67/1097 | 370/412 |
| 2005/0120173 A1 * | 6/2005 | Minowa | G06F 15/16 | 712/27 |
| 2006/0120672 A1 * | 6/2006 | Cody | G02B 6/4472 | 385/86 |
| 2007/0072474 A1 * | 3/2007 | Beasley | H02J 50/80 | 439/332 |
| 2007/0147267 A1 * | 6/2007 | Holland | H04L 49/25 | 370/465 |
| 2007/0276965 A1 * | 11/2007 | Johnson | G06F 3/00 | 710/8 |
| 2009/0060421 A1 * | 3/2009 | Parikh | G02B 6/4444 | 385/71 |
| 2009/0148101 A1 * | 6/2009 | Lu | G02B 6/3888 | 385/56 |
| 2010/0211664 A1 * | 8/2010 | Raza | H04L 41/24 | 713/300 |
| 2011/0043333 A1 * | 2/2011 | German | H04Q 1/136 | 340/815.45 |
| 2011/0058785 A1 * | 3/2011 | Solheid | G02B 6/4452 | 385/135 |
| 2011/0081144 A1 * | 4/2011 | Zhao | H04B 10/272 | 398/20 |
| 2011/0116748 A1 * | 5/2011 | Smrha | G02B 6/3825 | 385/76 |
| 2011/0123157 A1 * | 5/2011 | Belsan | G02B 6/4292 | 439/523 |
| 2011/0200286 A1 * | 8/2011 | Smith | G02B 6/3874 | 385/86 |
| 2012/0166582 A1 * | 6/2012 | Binder | G06F 21/602 | 709/217 |
| 2012/0188865 A1 * | 7/2012 | Michaelis | G01R 31/68 | 370/200 |
| 2013/0078848 A1 * | 3/2013 | Kummetz | H04Q 1/138 | 439/488 |
| 2013/0089291 A1 * | 4/2013 | Jol | G02B 6/3817 | 439/660 |
| 2013/0201006 A1 * | 8/2013 | Kummetz | G06K 7/10019 | 340/10.1 |
| 2014/0178013 A1 * | 6/2014 | Nielson | G02B 6/02 | 385/83 |
| 2014/0226460 A1 * | 8/2014 | Kretschmann | G06F 13/409 | 370/419 |
| 2015/0030323 A1 * | 1/2015 | Lawson | H04L 49/65 | 398/33 |
| 2015/0268434 A1 * | 9/2015 | Barnette, Jr. | G02B 6/4472 | 385/135 |
| 2015/0339570 A1 * | 11/2015 | Scheffler | G06N 3/04 | 706/27 |
| 2018/0006416 A1 * | 1/2018 | Lloyd | H05K 7/1487 | |
| 2018/0081135 A1 * | 3/2018 | Hill | G02B 6/4442 | |
| 2018/0081136 A1 * | 3/2018 | Hill | G02B 6/4444 | |
| 2019/0341711 A1 * | 11/2019 | Justin | H04L 69/08 | |
| 2020/0088964 A1 * | 3/2020 | Desard | H02G 15/013 | |
| 2020/0200982 A1 * | 6/2020 | Dowling | H02G 15/013 | |
| 2021/0002170 A1 * | 1/2021 | Chien | C03B 27/012 | |

\* cited by examiner

FLEXIBLE OPTICAL FIBER CONNECTORS AND ASSEMBLIES

CROSS REFERENCE TO RELATED APPLICATION

This application is a divisional application of and claims priority to U.S. patent application Ser. No. 16/897,587 filed Jun. 10, 2020 which claims benefit of priority under 35 U.S.C. 119(e) to the filing date of U.S. Provisional Patent Application 62/859,828, filed on Jun. 11, 2019, entitled, "Flexible Optical Fiber Connectors and Assemblies," the contents of both of which are incorporated herein by reference in their entirety.

TECHNICAL FIELD

The present disclosure relates generally to optical fiber communications, and more specifically to optical fiber connectors and assemblies.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable. In instances when the connection may be exposed to weather conditions, an essentially waterproof configuration of components is needed.

To interconnect the cables, various cable connector designs provide for low insertion loss and stability. Some example connectors may include, but are not limited to, SC, Dual LC, LC, ST and MPO connectors. In most of these designs, ferrules (one in each connector, or one in the connector and one in the apparatus or device), each containing an optical fiber end, are butted together end to end and light travels across the junction.

With the increasing desire for completely optical networks, "fiber to the premises" (FTTP) or "fiber to the home" (FTTH) systems are being developed to provide optical fibers that extend from the source to the site of the end-user. There is a need for flexible, customizable fiber distribution systems that may be easily expanded or reconfigured. Further, there is a need for flexible optical fiber connectors and assemblies that allow easy configuration of optical fiber networks.

SUMMARY

According to one aspect of the present disclosure, there is provided a flexible optical fiber connector comprising a first housing component configured to couple to a terminating connector, a second housing component configured to receive an optical fiber for termination in the terminating connector. The first housing component and the second housing component are further configured to receive a pushable connector therethrough.

The terminating connector may comprise a back post. The back post may be configured to receive a spring and a ferrule. In some embodiments, the terminating connector may be an SC connector.

In some embodiments, the first housing component may comprise a first prong and a second prong separated by a slit, each of the first prong and the second prong having a double-D hole and a flat configured to accommodate coupling the first housing component to the terminating connector. In some embodiments, the flexible optical fiber connector may further comprise a key configured to prevent rotation of the flexible optical fiber connector within a port.

According to another aspect, there is provided a flexible optical fiber connector assembly comprising a flexible connector having a housing configured to receive an optical fiber, and a terminating connector comprising a back post and a ferrule configured to receive the optical fiber. The flexible connector may be configured to couple to the terminating connector.

In some embodiments, the terminating connector may further comprise an outer housing. In some embodiments, the flexible optical fiber connector assembly may further comprise a crimp ring disposed between the flexible connector and the outer housing to prevent rotation of the terminating connector relative to the flexible connector. The outer housing may comprise a key configured to prevent rotation of the optical fiber connector assembly. In some embodiments, the terminating connector may be configured to decouple from the flexible connector to allow the flexible connector to receive a pushable connector therethrough in lieu of the terminating connector.

According to another aspect, there is provided a terminal comprising a port base comprising a plurality of ports. At least one port of the plurality of ports may be configured to receive a flexible connector. The flexible connector may be configured to receive a pushable connector. The flexible connector may also be configured to couple to a terminating connector. The at least one port may be further configured to receive a holder for holding an adapter configured to receive the terminating connector. In some embodiments, the port base may be further configured to receive a plate configured to couple to the port base to secure the holder for holding the adapter to the at least one port.

In various embodiments of the terminal, the flexible connector may comprise a first housing component configured to couple to the terminating connector, and a second housing component configured to receive an optical fiber for termination in the terminating connector. In some embodiments, the first housing component may comprise a first prong and a second prong separated by a slit, each of the first prong and the second prong having a double-D hole and a flat configured to accommodate coupling the first housing component to the terminating connector. In various embodiments, the terminating connector may comprise a back post configured to couple to the first housing component, a spring, and a ferrule for terminating the optical fiber. The back post may be further configured to receive the spring and the ferrule. In some embodiments, the terminating connector may further comprise an internal housing for housing the ferrule and an outer housing.

In various embodiments, the holder may comprise a base portion configured to couple to the at least one port, and an adapter holding portion configured to hold the adapter. In some embodiments, the holder may be a single integral piece. In some embodiments, the at least one port may be configured to receive a plurality of different holders, each holder of the plurality of different holders being configured to hold a different adapter for coupling to a different terminating connector. In various embodiments, the at least one port may be a flexible port comprising a seal, a press-in element, and a clip.

BRIEF DESCRIPTION OF THE FIGURES

FIGS. 23A and 24B are perspective and cross-sectional views of the port base of FIG. 22 according to aspects of the present disclosure.

DETAILED DESCRIPTION

The present disclosure is not limited in terms of the particular embodiments described in this application, which are intended as illustrations of various aspects. Many modifications and variations can be made without departing from its spirit and scope, as will be apparent to those skilled in the art.

Aspects of the present disclosure provide flexible optical fiber connectors and connector assemblies that allow easy configuration and reconfiguration of optical fiber networks. For example, embodiments allow for making external connections to an optical fiber terminal or enclosure without opening the terminal or enclosure.

Figure 1A:
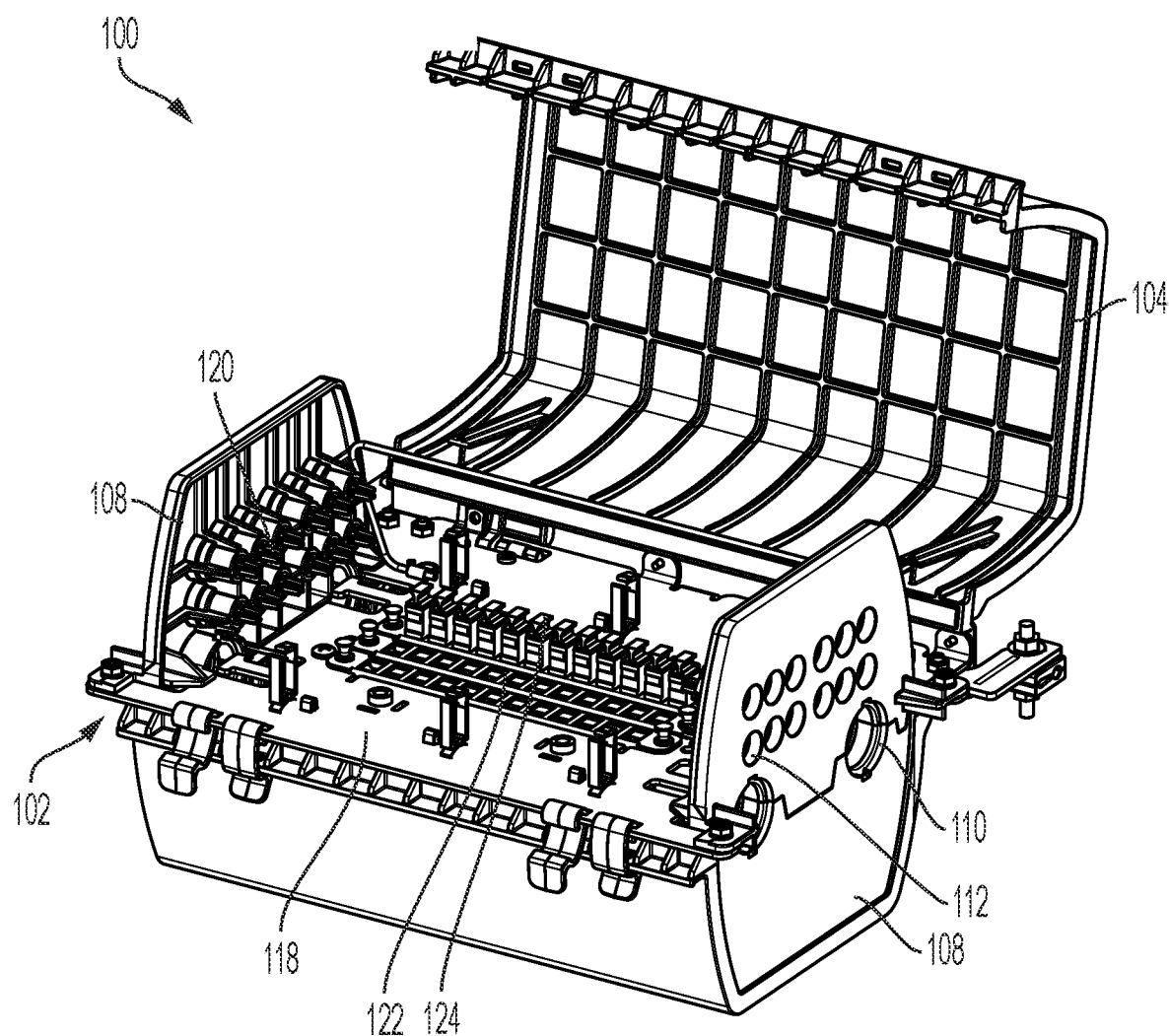
FIG. 1A is a perspective view of one embodiment of a terminal.

FIG. 1A is a perspective view of one embodiment of a terminal 100. The terminal 100 is an aerial terminal. However, embodiments of connectors disclosed herein are not limited for use with aerial terminals. For example, embodiments may be used with other types of terminals and enclosures. The terminal 100 includes a housing 102 and two covers 104 on either side of the terminal. The housing 102 of the aerial terminal 100 includes side panels 108 on opposite sides of the housing. Each side panel 108 may include a plurality of ports, including feeder ports 110 and distribution ports 112. The two feeder ports 110 are shown to be larger than the distribution ports 112. In one example, each feeder port 110 may be about 14 mm sealed duct port. Each feeder port 110 may have a breakoff cap. In some embodiments, feeder ports 110 may have anti-rotation locking features. The 12 smaller ports are distribution ports 112. Each distribution port 112 may be about 10 mm sealed duct port. Each distribution port 112 may have a breakoff cap. In some embodiments, the distribution ports 112 may have anti-rotation locking features. The distribution ports 112 may be Clearfield FlexPorts. Although this embodiment shows two feeder ports 110 and 12 distribution ports 112, other embodiments may include a different number of each type of port. The ports 110 and the ports 112 may be sealed. The ports 110 and 112 may include knock-out covers that can be removed once a port 110 and 112 is used. The ports may also be arranged in a different configuration than the embodiment shown in FIG. 1A.

FIG. 1A shows one of the covers 104 of the terminal 100 being open, revealing a compartment 118 positioned on one side of the terminal. As shown in FIG. 1A, each distribution port 112 has a respective entrance tab 120 inside the compartment 118. The entrance tabs 120 must be broken off to use the respective ports 112. The compartment 118 further includes at least one adapter plate 122. The adapter plate 122 includes a plurality of adapters 124. The adapters 124 may correspond to the distribution ports 112. The adapter plates 122 may be arranged in a plurality of rows. In one embodiment, a first row comprising a first adapter plate may correspond to the distribution ports on a first side panel of the terminal, and a second row comprising a second adapter plate may correspond to distribution ports on a second side panel of the terminal.

Figure 1B:
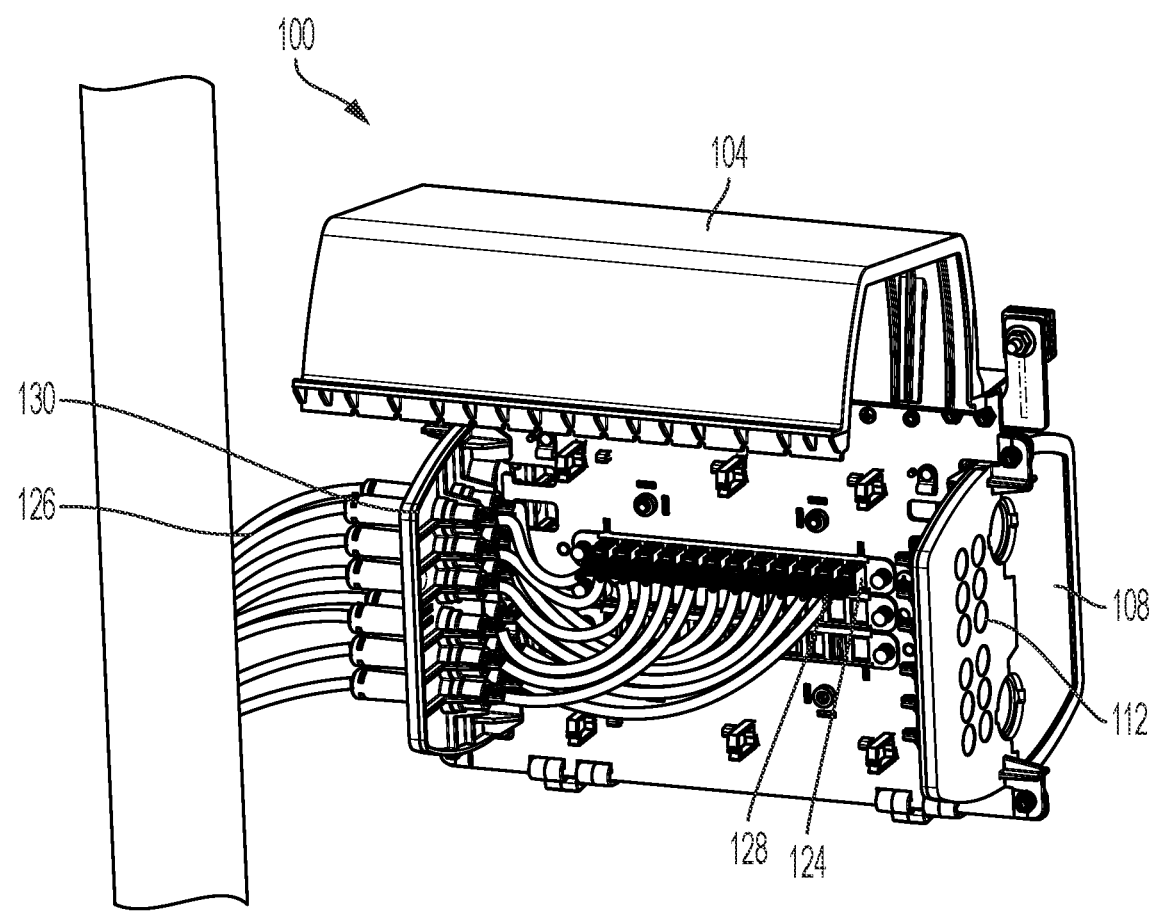
FIG. 1B is a perspective view of the terminal of FIG. 1A, further showing incoming cables and connectors.

FIG. 1B is a perspective view of the aerial terminal 100, further showing incoming cables and connectors. For example, a cable 126 is coupled to a pushable connector 128 that is configured to couple to an adapter 124. A flexible connector 130 (e.g. a Clearfield Flex Connector) coupled to a port 112 (e.g. a Clearfield FlexPort) is configured to receive the pushable connector 128.

Figure 2:
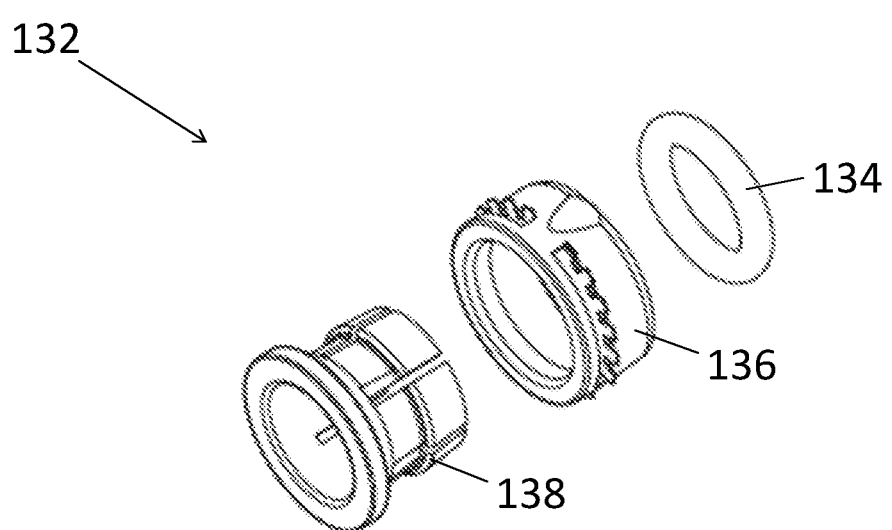
FIG. 2 is a perspective view of one embodiment of a flexible port (FlexPort) configured to receive embodiments of connectors according to aspects of the present disclosure.

FIG. 2 is a perspective view of one embodiment of a flexible port (FlexPort) 132 configured to receive embodiments of connectors disclosed herein. The flexible port 132 comprises a seal, such as an O-Ring 134, a press-in element 136 and a clip 138. In some embodiments, a flexible port 132 may be pre-installed within the distribution ports of a terminal, such as distribution ports 112 of terminal 100. In other embodiments, a flexible port 132 may be installed in the field. A flexible port 132 may be installed by placing the seal or O-ring 134 into the desired port hole, placing the press-in element 136 into the hole, and installing the clip 138 into the press-in element. The flexible ports 132 may further comprise entrance tabs that must be broken off prior to usage of the flexible ports.

Figure 3:
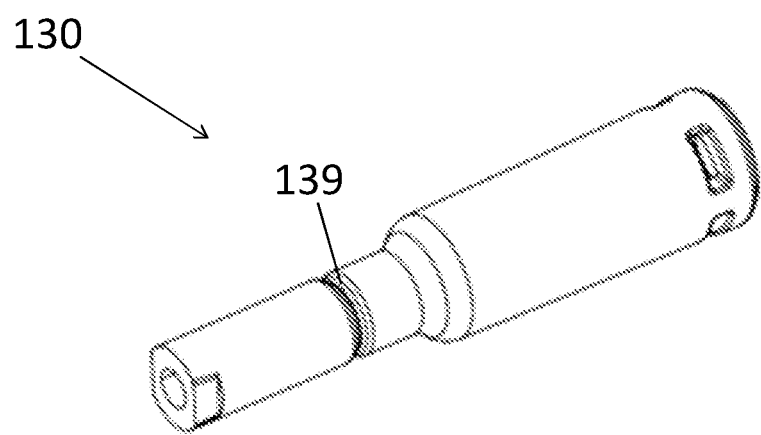
FIG. 3 is a perspective view of one embodiment of a flexible connector (FlexConnector) for receiving a pushable connector.
Figure 4:
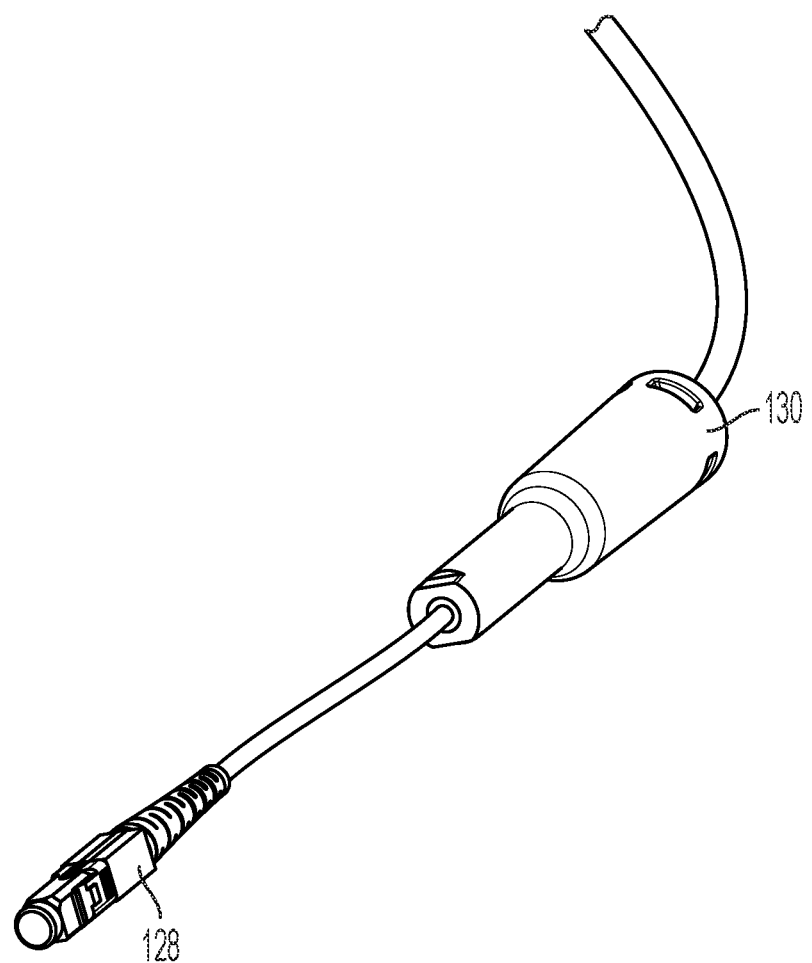
FIG. 4 is a perspective view of the flexible connector of FIG. 3 with a pushable connector therethrough.

FIG. 3 is a perspective view of one embodiment of a flexible connector 130 for receiving a pushable connector 128. The flexible connector 130 has a clip groove 139. FIG. 4 is a perspective view of the flexible connector 130 with the pushable connector 128 inserted therethrough.

Referring back to FIG. 1B, a connection from the flexible connector 130 to the adapter 124 requires a pushable connector 128 and also requires that the terminal 100 be opened to make the connection. Accordingly, there is a need for flexible "plug and play" connectors that allow making external connections to an optical fiber terminal or enclosure that has flexible ports (FlexPorts) without opening the terminal or enclosure.

In various embodiments disclosed herein, the flexible port 132, as illustrated for example in FIG. 2, may further be configured to receive an adapter therein. The adapter within the flexible port may be coupled to various embodiments of connectors disclosed herein, thereby avoiding the need to open a terminal, box, or any other enclosure on which the flexible port is located.

Figure 5:
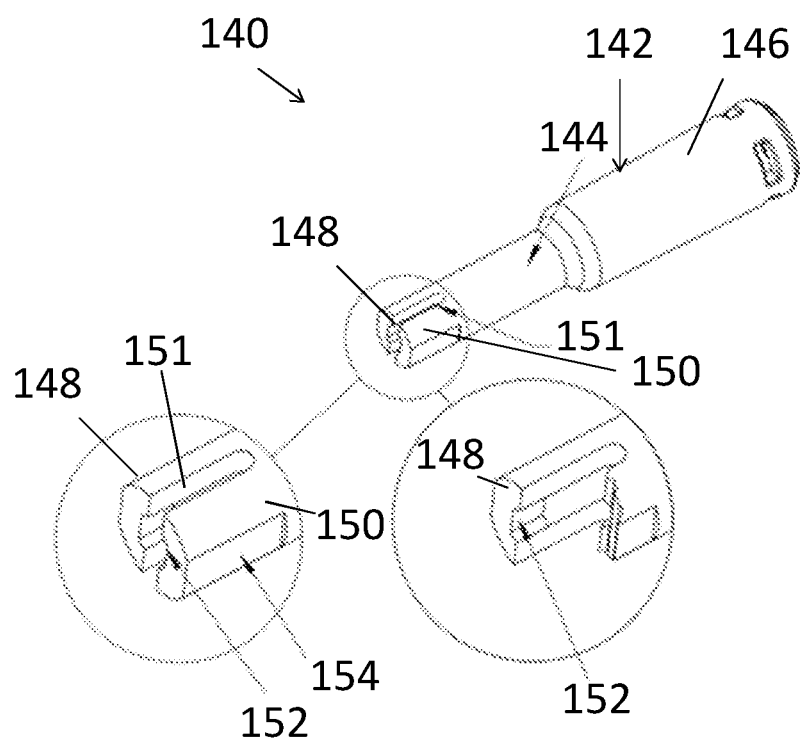
FIG. 5 is a perspective view of one embodiment of a flexible connector configured according to aspects of the present disclosure.

FIG. 5 is a perspective view of one embodiment of a flexible connector configured according to aspects of the present disclosure. The connector 140 includes a housing 142 configured to couple to a flexible port, such as port 132 shown in FIG. 2. The connector 140 may be a 10 mm flex connector configured to couple to a 10 mm flex port. The connector 140 may include a first housing portion 144 and a second housing portion 146. The first housing portion 144 and the second housing portion 146 may have different diameters. For example, the first housing portion 144 may have a smaller diameter than the second housing portion 146. The first housing portion 144 may be configured to couple to a ferrule connector assembly, for example as shown and further discussed below with reference to FIGS. 6 to 14. The flexible connector 140 may have a first prong 148 and a second prong 150, separated by a slit 151. The prongs may have a double-D hole 152 formed between them. Each of the prongs 148 and 150 may have a respective flat 154. The flats 154 may be relatively long, for example, to accommodate coupling to the ferrule connector assembly. The flexible connector 140 may thus be coupled to a terminating connector housing a ferrule. The housing 142 of the flexible connector 140 may not have a clip groove, such as clip groove 139 shown in FIG. 3.

Figure 6:
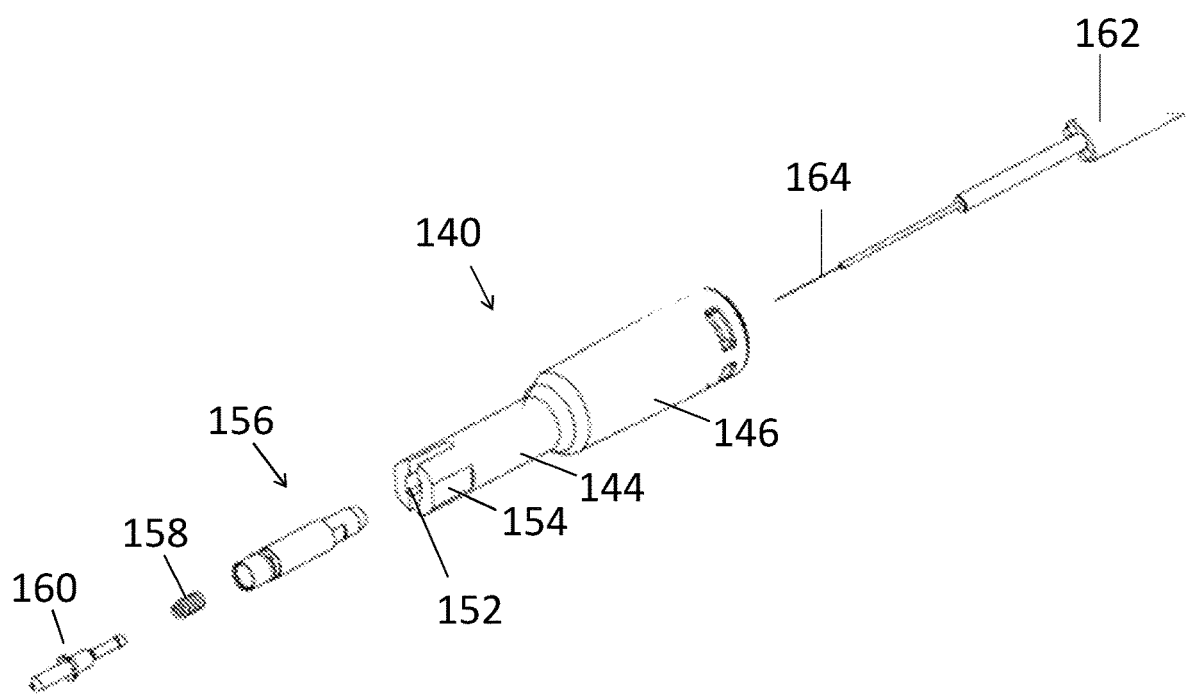
FIG. 6 is an exploded view of a flexible connector assembly configured according to aspects of the present disclosure.

FIG. 6 is an exploded view of a flexible connector assembly configured according to aspects of the present disclosure. The flexible connector assembly includes the flexible connector 140, a back post 156, a spring 158, and a ferrule 160. The double-D hole 152 of the flexible connector 140 is configured to hold at least a portion of the back post 156. The back post 156 is further configured to receive the spring 158 and the ferrule 160. In this embodiment, the back post is an SC back post. In other embodiments, different types of back posts may be used. An optical fiber cable 162 comprising a plurality of optical fibers 164 may be received by the second housing portion 146 of the flexible connector 140, and the optical fiber 164 may be extended to the ferrule 160 and bonded to the ferrule.

Figure 7:
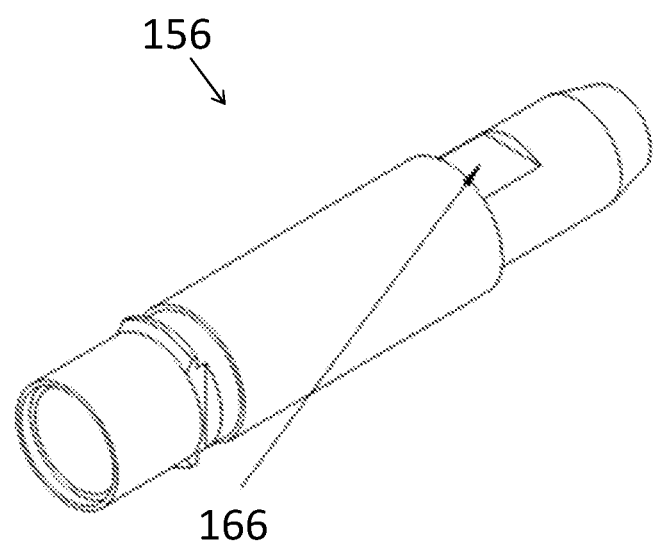
FIG. 7 is a perspective view of one embodiment of an SC back post configured according to aspects of the present disclosure.

FIG. 7 is a perspective view of the SC back post 156. The SC back post 156 is longer than a traditional SC back post. The back post 156 further comprises flats 166 configured to be held by the double-D hole 152 of the flexible connector 140.

Figure 8:
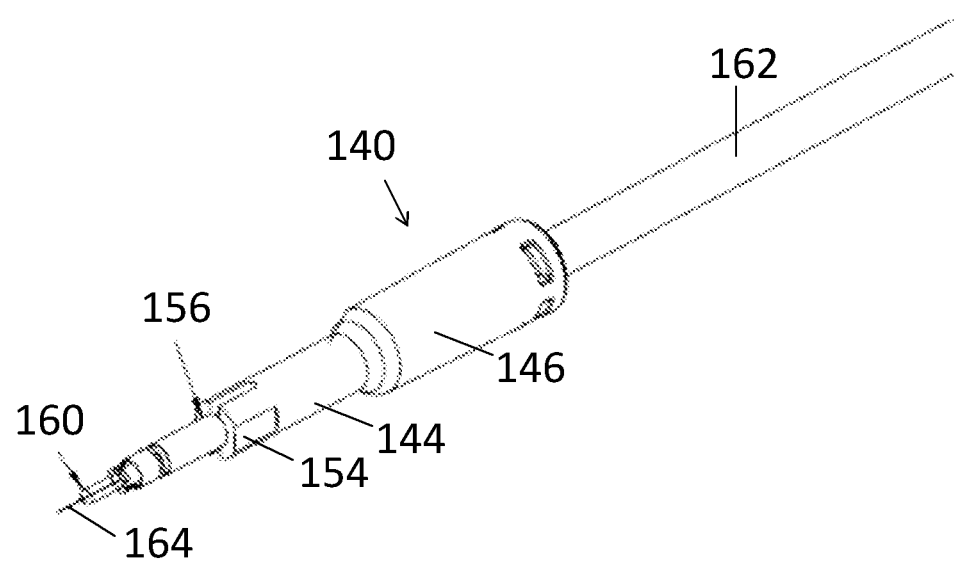
FIG. 8 is an assembled perspective view of the flexible connector assembly of FIG. 6 according to aspects of the present disclosure.

FIG. 8 shows an assembled perspective view of the flexible connector assembly of FIG. 6. As shown, the snap-in back post 156 is snapped into the double-D hole 152 and coupled to the first housing portion 144 of the flexible connector 140. The optical fiber 164 is received through the ferrule 160, epoxied and cured.

Figure 9:
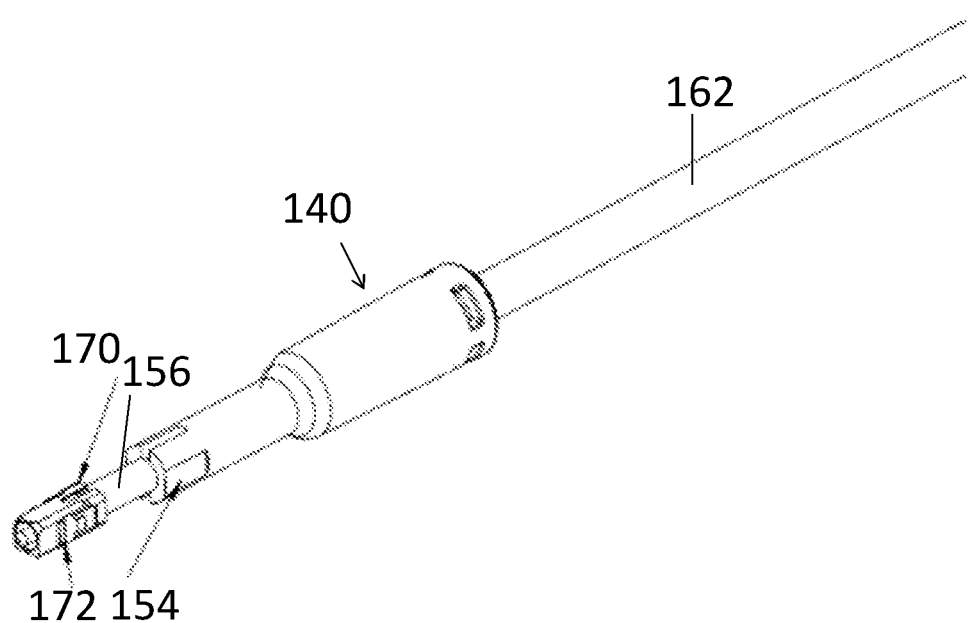
FIG. 9 is a perspective view of the flexible connector assembly of FIG. 8 further comprising a housing according to aspects of the present disclosure.

FIG. 9 is a perspective view of the flexible connector assembly of FIG. 8 further comprising a housing 170. The housing 170 may be an SC white housing. The housing 170 may be configured to house the ferrule 160 and to couple to the back post 156. The housing 170 may have keys 172 that are keyed to the flexible connector flats 154 by the back post 156 inside the double-D shaped hole 152.

Figure 10:
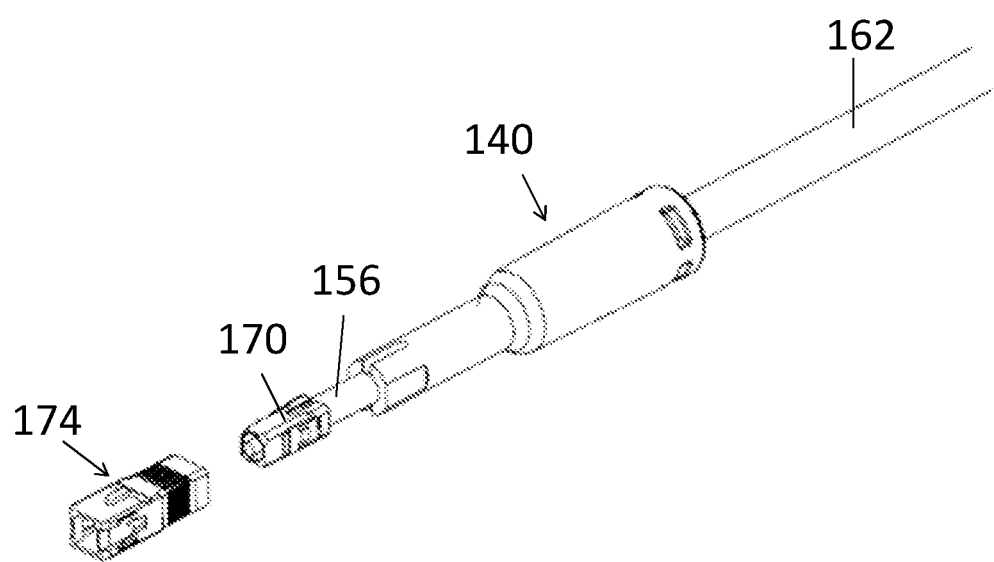
FIG. 10 is a perspective view of the flexible connector assembly of FIG. 9 further comprising an outer housing according to aspects of the present disclosure.

FIG. 10 is a perspective view of the flexible connector assembly of FIG. 9, further comprising an outer housing 174. The outer housing 174 may be configured to house the inner housing 170 and at least a portion of the back post 156. In some embodiments, the outer housing 170 may be a temporary SC outer housing for production polishing. The temporary SC outer housing may be replaced with a final housing after optical inspection.

Figure 11:
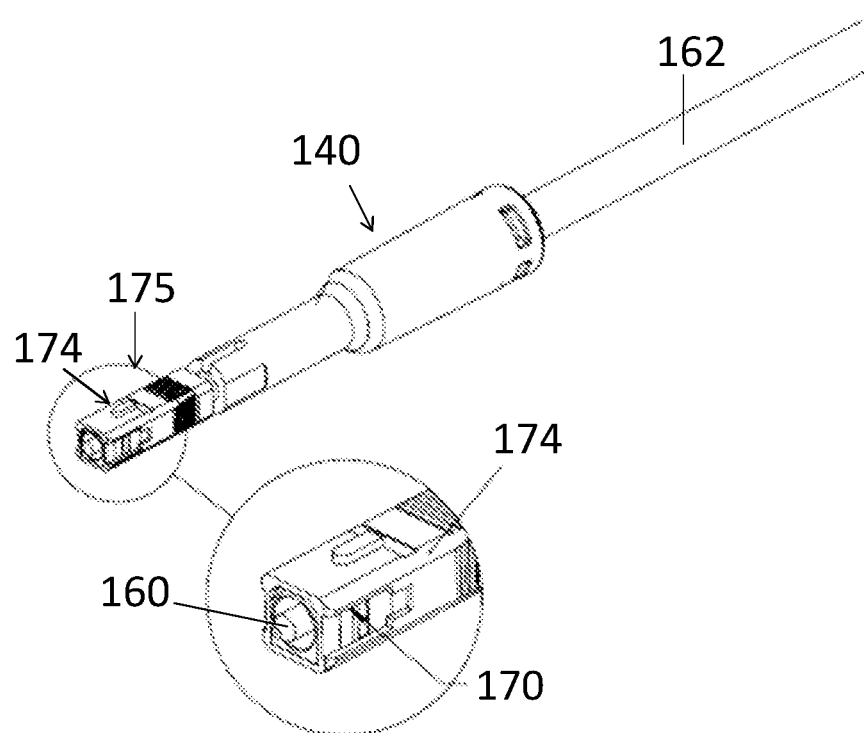
FIG. 11 is a perspective view of the flexible connector assembly of FIG. 10, further illustrating the outer housing according to aspects of the present disclosure.

FIG. 11 is a perspective view of the flexible connector assembly of FIG. 10, further illustrating the outer housing 174. The outer housing 174 may be configured to fit through a 10 mm port opening, such as that of the flexible port 132 shown in FIG. 2. In some embodiments, the outer housing 174 may be modified to prevent adapter latching. The flexible connector assembly of FIG. 11 comprises the flexible connector 140 and a terminating connector. In this embodiment, the terminating connector is an SC connector 175. The SC connector 175 comprises an outer housing 174, inner housing 170, spring 158, ferrule 160, and back post 156. In various embodiments, the flexible connector 140 may be configured to prevent the attached terminating connector from rotating and/or being pulled out from the tip of the flexible connector.

Figure 12:
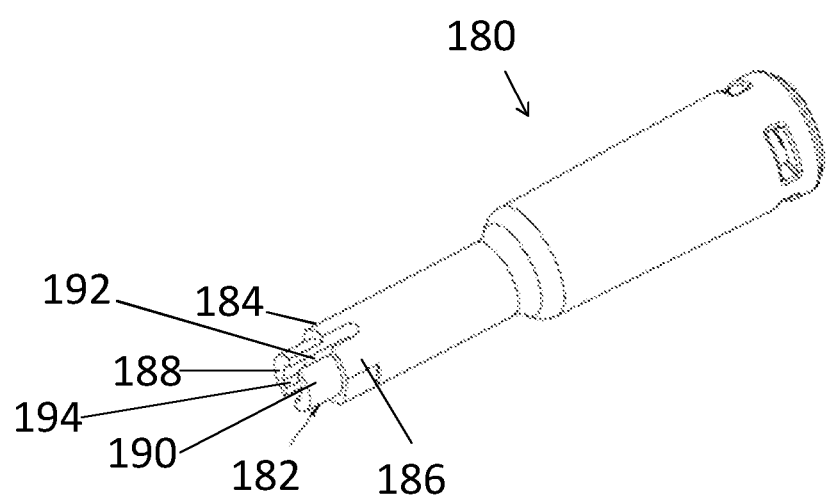
FIG. 12 is a perspective view of another embodiment of a flexible connector having a protrusion configured to receive a crimp ring according to aspects of the present disclosure.

FIG. 12 is a perspective view of another embodiment of a flexible connector 180. The flexible connector 180 is configured similarly to the connector 140 described above. Further, the flexible connector 180 has a protrusion 182 configured to receive a crimp ring to prevent rotation of the connector attached to the flexible connector. The protrusion 182 may be a cylindrical section emanating from within the two prongs 184 and 186 of the flexible connector 180. The cylindrical protrusion 182 may also include a plurality of prongs, such as a first prong 188 and a second prong 190, separated by a slit 192, and with a double-D hole 194 located between them. The double-D hole 194 of the protrusion 182 is also configured to receive at least a portion of the back post of the connector coupled to the flexible connector.

Figure 13:
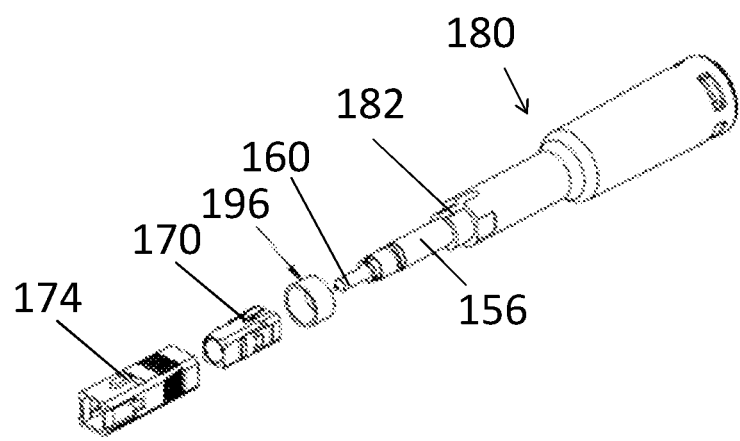
FIG. 13 is an exploded perspective view of a flexible connector assembly having a crimp ring according to aspects of the present disclosure.
Figure 14:
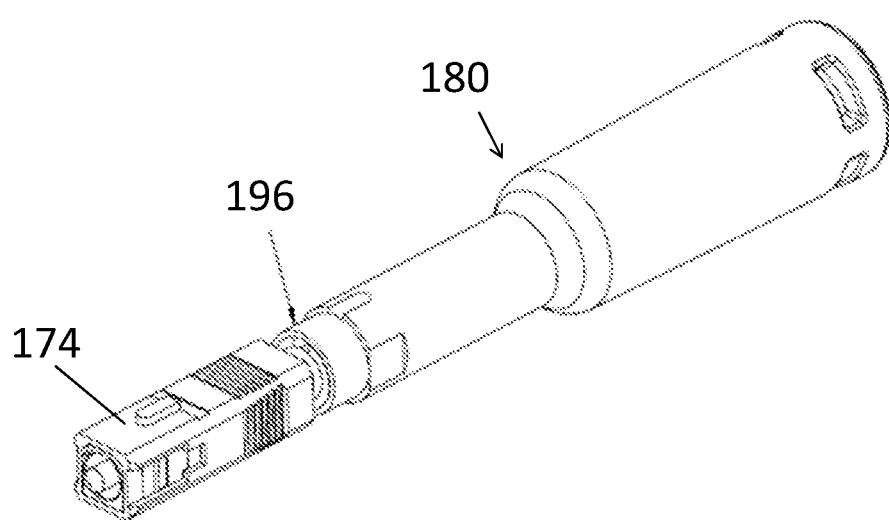
FIG. 14 is an assembled perspective view of the flexible connector assembly of FIG. 13 according to aspects of the present disclosure.

FIG. 13 is an exploded perspective view of a flexible connector assembly including the flexible connector 180 of FIG. 12. The flexible connector assembly has a crimp ring 196. The crimp ring 196 is sized to fit onto the cylindrical protrusion 182. FIG. 14 is an assembled perspective view of the flexible connector assembly of FIG. 13, further showing the crimp ring disposed on the cylindrical protrusion 182 between the flexible connector 180 and the outer housing 174 of the terminating SC connector coupled to the flexible connector. In various embodiments, the crimp ring may be used to prevent rotation of the terminating connector relative to the flexible connector.

Various embodiments provide flexible connectors that are truly "plug and play" without entering the closure of terminals or closures, such as Clearfield YourX terminal(s), FlexBox, YourX TAP, etc. Various embodiments have a ferrule/connector assembly configured to snap firmly into the flexible connector body, as described above, and then be mateable to an adapter/connector on the other side of a flexible port (FlexPort) by inserting the flexible connector into the port and snapping the ferrule/connector in place, for example as shown and described further below in relation to FIGS. 15 to 23.

In some embodiments, the pushable end may enter the flexible connector through the back of connector, with the key and lock protruding far enough out of the flexible connector to allow room for "mating" inside adapter of the flexible port.

Various embodiments may use the flexible connectors disclosed herein in conjunction with various types of connectors, including but not limited to SC, LC and MPO connectors.

Various embodiments of flexible connectors disclosed herein may be configured to accept both a pushable connector, for example as shown in FIG. 4, as well as a snap-in connector, for example as shown in FIGS. 5 to 14.

Embodiments of connectors disclosed herein may be watertight and configured to prevent contamination. Embodiments exposed to elements may be impervious to weather, ultraviolet radiation per UL "F-1" rating.

Various embodiments may be assembled by the user without tools. Assembly may include inserting a connector into the flexible connector to form a flexible connector assembly. The flexible connector assembly may then be inserted into an adapter located inside a flexible port, for example as shown and described below in relation to FIGS. 15 to 23. Embodiments of the connector may be keyed for proper alignment in adapter at mating. In various embodiments, the adapter within the flexible port may be configured to receive the ferrule of the flexible connector assembly at one end. The adapter within the port may also be configured to receive a standard connector such as a standard SC, LC or MPO connector at the other end of the adapter. One end of the adapter may be accessible from outside the terminal or enclosure on which the flexible port is located, whereas the other end of the adapter may be accessible from inside the terminal or enclosure. In some embodiments, the adapter plug or at least one side of the adapter may be latchless to allow removal of the flexible connector assembly.

Figure 15:
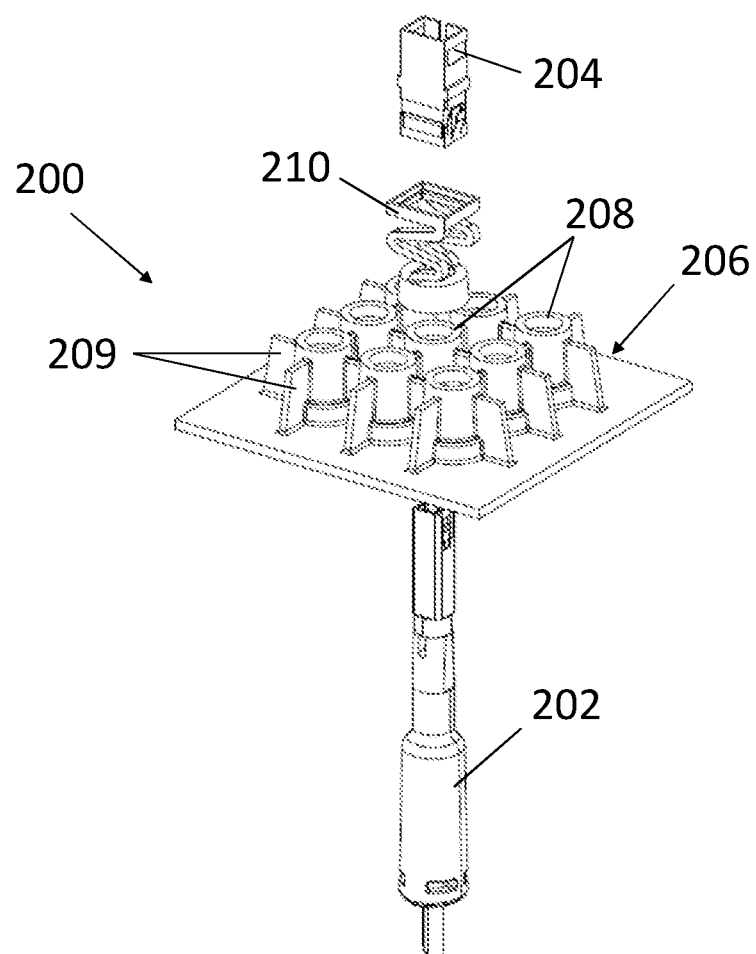
FIG. 15 is a partially disassembled perspective view of a flexible connector and adapter system being coupled through one embodiment of a port base and holder configured according to aspects of the present disclosure.

FIG. 15 shows a partially disassembled view of a flexible connector and adapter system 200. A flexible connector assembly 202 is configured to couple to an adapter 204 through the opening of a port 208. In some embodiments, for example as described below in relation to FIG. 21, the port 208 may comprise a flexible port 132 as described above in relation to FIG. 2. A port base 206 comprises a plurality of ports 208 with openings. The port base 206 may further comprise a plurality of ribs 209 positioned around each of the ports 208. The port base 206 may be positioned, for example, within a terminal such as that shown in FIG. 1A. A holder 210 is configured for coupling to a port 208 at one end, and for receiving and holding the adapter 204 through the other end, as described further below in relation to FIG. 19.

Figure 16:
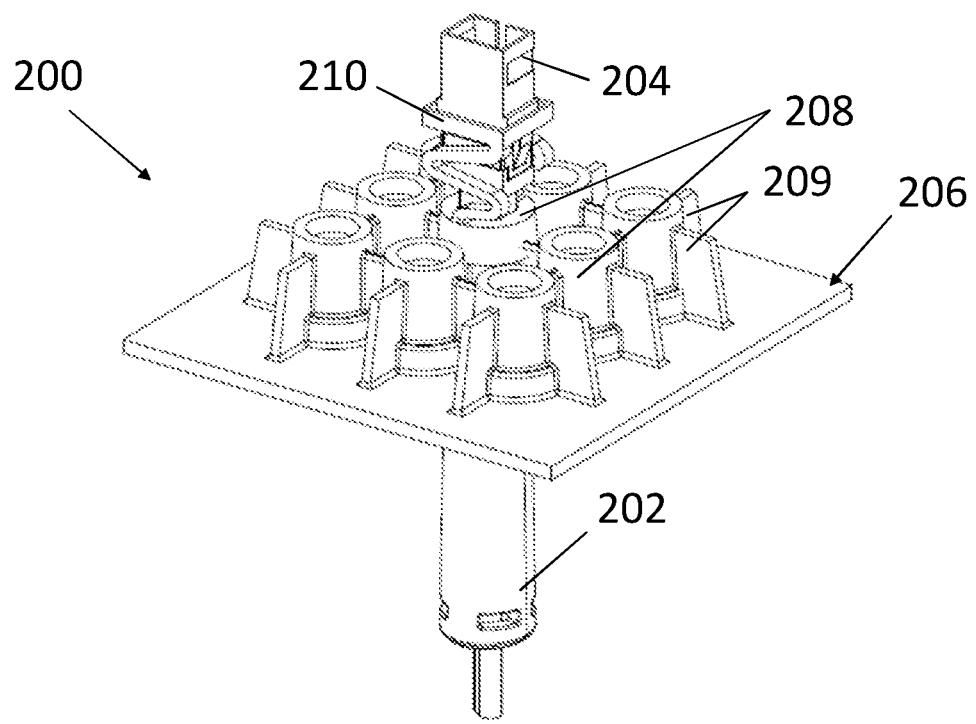
FIG. 16 is a perspective view of the assembled flexible connector and adapter system of FIG. 15 according to aspects of the present disclosure.

FIG. 16 shows the assembled flexible connector and adapter system of FIG. 15. The flexible connector assembly 202 is mateable with the adapter 204 held by the holder 210 on the other side of the port base 206 by inserting the terminating connector at the end of the flexible connector assembly into the port 208 and snapping the ferrule/connector in place.

Figure 17A:
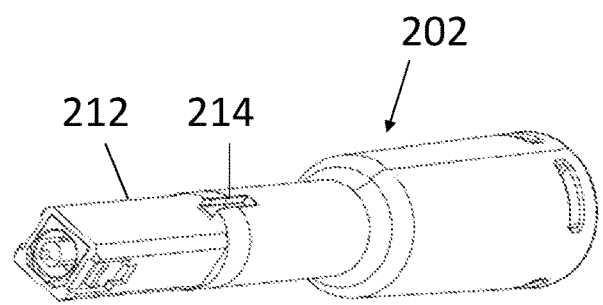
FIGS. 17A and 17B are perspective views of another embodiment of a flexible connector assembly having a key according to aspects of the present disclosure.
Figure 17B:
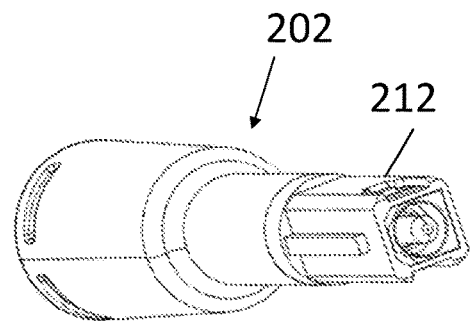
Figure 18:
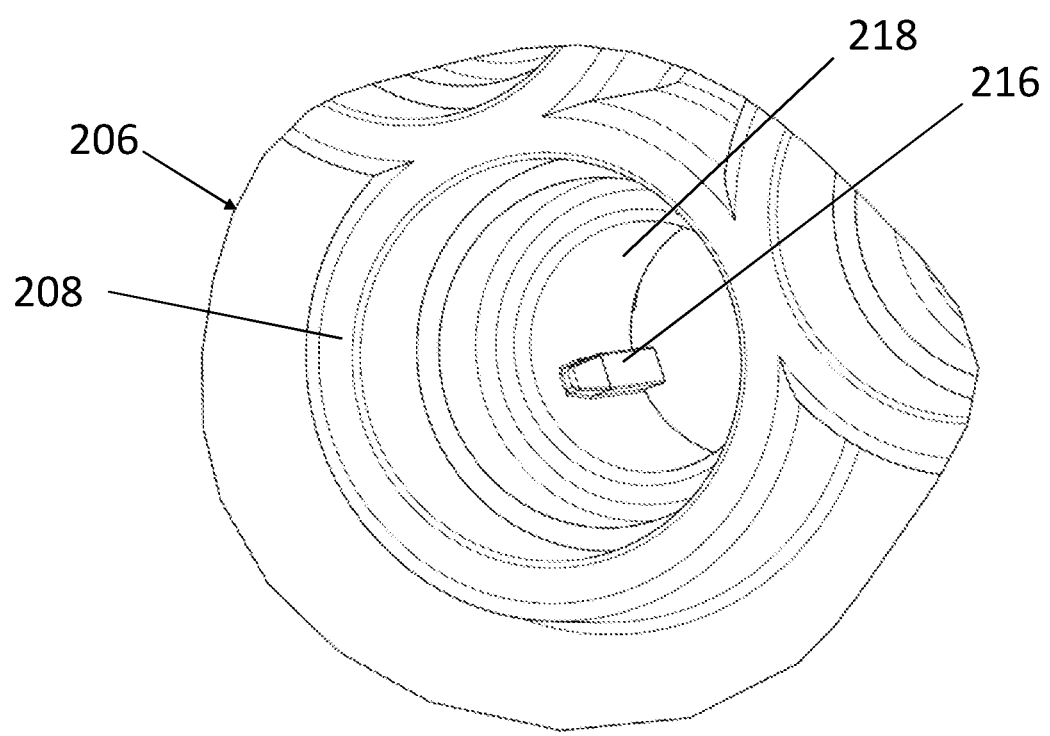
FIG. 18 is an interior view of a port showing a protrusion according to aspects of the present disclosure.

FIGS. 17A and 17B show the flexible connector assembly 202 including a flexible connector coupled to a terminating connector having an outer housing 212. In this embodiment, the terminating connector is an SC connector. The outer housing may be configured to prevent locking tabs on the adapter from engaging. In this embodiment, the flexible connector assembly 202 includes a key way 214 configured to prevent the flexible connector assembly from turning. For example, a protrusion 216 on an interior surface 218 of the port 208 of the port base 206, shown in FIG. 18, fits within the key way 214 of the flexible connector assembly 202, thereby preventing the flexible connector from turning.

Figure 19A:
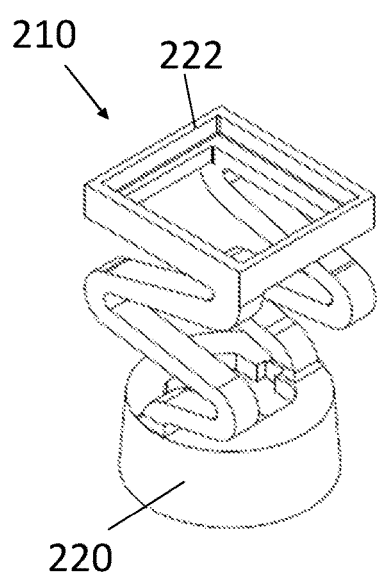
FIGS. 19A to 19C are various views of one embodiment of a holder configured according to aspects of the present disclosure.
Figure 19B:
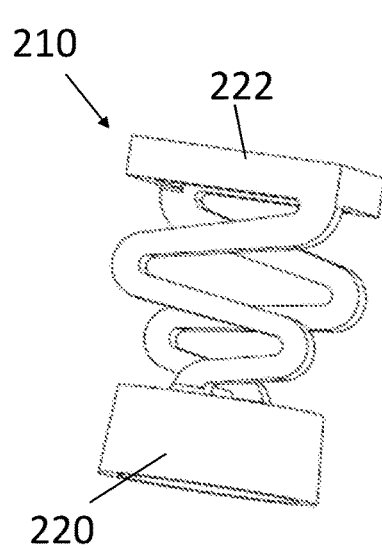
Figure 19C:
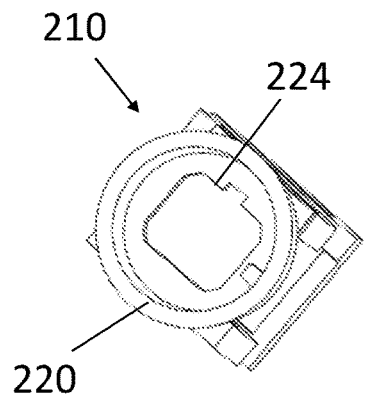

FIGS. 19A to 19C show one embodiment of a holder 210 configured according to aspects of the present disclosure. The holder 210 is a spring holder comprising a base portion 220 at one end and an adapter holding portion 222 at the other end. The base portion 220 is configured to couple to the port 208. In various embodiments, any coupling mechanism may be used for coupling the base portion 220 to the port 208. For example, the base portion 220 may be threaded onto the port 208, may be snapped in or coupled by a latch.

Figures 20A, 20B:
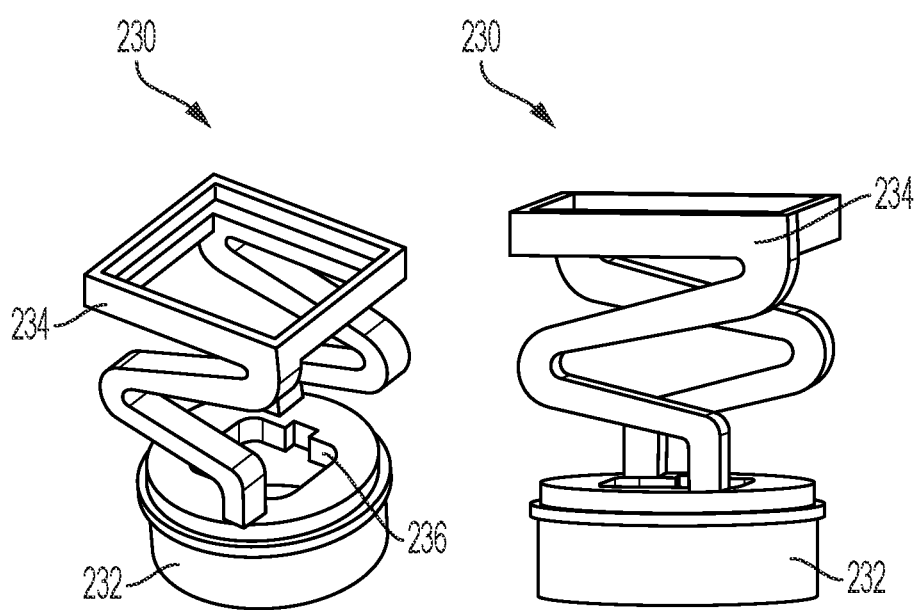
FIGS. 20A and 20B are perspective views of another embodiment of a holder configured according to aspects of the present disclosure.

The holders 210 may be removable from the ports 208. The ports 208 may be configured to receive a plurality of different types of holders. Each holder may be configured to hold a different type of adapter. For example, FIGS. 20A and 20B show another embodiment of a spring holder 230 comprising a base portion 232 and an adapter holding portion 234, with a cutout 236 for receiving a connector. In other embodiments, holders may be formed integrally with the ports.

Referring again to FIGS. 19A to 19C, the holder 210 further comprises an adapter holding portion 222. The adapter holding portion 222 is configured to receive and retain an adapter 204, as shown for example in FIGS. 15 and 16. In various embodiments, any mechanism may be used for retaining adapters within the adapter holding portion 222 of the holder 210. In the embodiment shown in FIGS. 19A to 19C, the adapter holder portion 222 is shaped and sized to receive an SC adapter. Other embodiments of adapter holding portions may be shaped and sized differently for other types of connectors.

The base portion 220 of the holder 210 is configured to allow for the best alignment, orientation and positioning of the flexible connector assembly 202 with the adapter 204. The holder 210 is self-centering, but configured to move in any direction as shown for example in FIG. 19B. The holder 210 is not influenced by the orientation of the terminal or enclosure, or gravity. The holder 210 is configured to provide force to maintain connector mating. The base portion 220 of the holder 210 includes a cutout 224 that matches the shape and size of the terminating connector to be received, thereby determining the orientation of the connector. For example, FIG. 19C shows the cutout 224 corresponding to an SC terminating connector. Other embodiments of holders may have different cutouts for different types of terminating connectors, such as an LC connector.

Various embodiments of holders may be formed integrally as a single piece. For example, the base portion 220 and the adapter holding portion 222 may be molded or formed integrally with the spring holder. In other embodiments, the holder may comprise multiple pieces.

Various embodiments of port bases and ports disclosed herein may be configured to receive both a flexible connector with a pushable connector, as well as a flexible connector coupled to a terminating connector as disclosed herein. In various embodiments, the ports may be configured as flexible ports.

Figure 21:
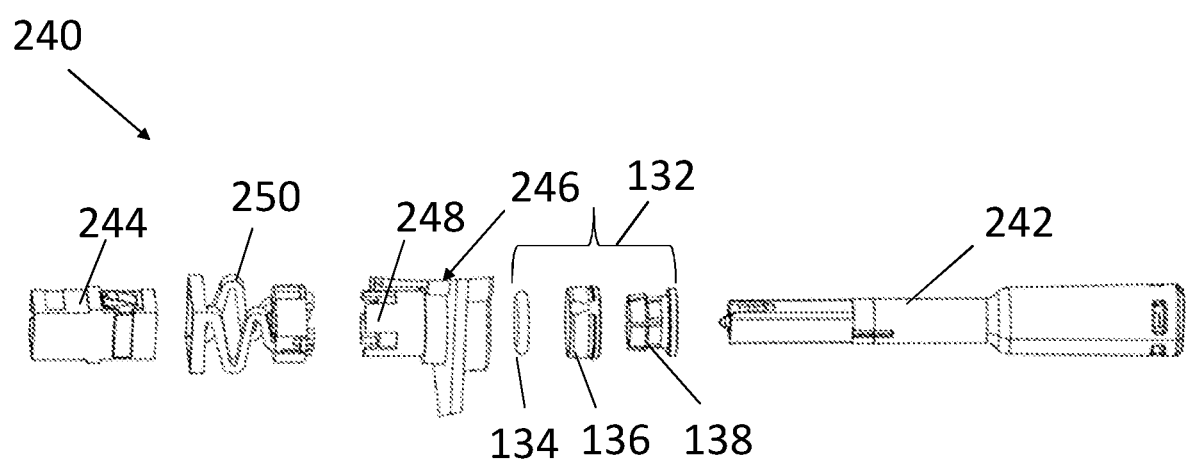
FIG. 21 is a disassembled perspective view of another embodiment of a flexible connector and adapter system including a flexible port according to aspects of the present disclosure.

FIG. 21 shows a disassembled perspective view of another embodiment of a flexible connector and adapter system 240 using a flexible port 132 as described in relation to FIG. 2. A flexible connector assembly 242 is configured to couple to an adapter 244 through the opening of a port 248. In this embodiment, the port 248 comprises a flexible port 132. The flexible port 132 may be installed by placing the seal or O-ring 134 into the opening of the port 248 located on the port base 246, placing the press-in element 136 into the opening, and installing the clip 138 into the press-in element. The other end of the port 248 is configured to receive the holder 250. A holder 250 is configured for coupling to a port 248 at one end, and for receiving and holding the adapter 244 through the other end. For example, the holder 250 may be snapped into the port 248. The port base 246 comprises a plurality of ports 248 with openings. The port base 246 may be positioned, for example, within a terminal such as that shown in FIG. 1A. The flexible connector assembly 242 is mateable with the adapter 244 held by the holder 250 on the other side of the port base 246 by inserting the terminating connector at the end of the flexible connector assembly into the flexible port 132 and snapping the ferrule/connector in place.

Figure 22:
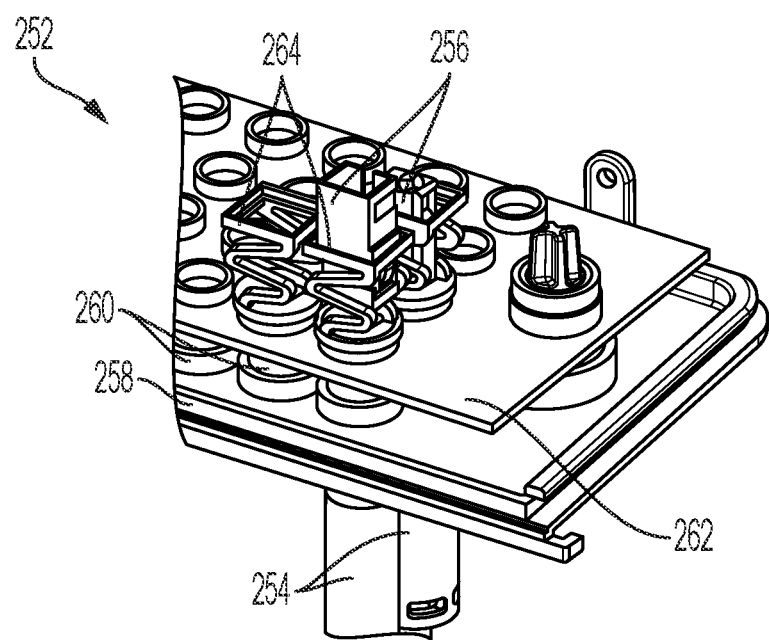
FIG. 22 is a perspective view of a flexible connector and adapter system coupled through another embodiment of a port base configured according to aspects of the present disclosure.

FIG. 22 is a perspective view of a flexible connector and adapter system 252 comprising flexible connectors 254 coupled to adapters 256. A port base 258 comprises a plurality of ports 260 with openings. The port base 258 may be positioned, for example, within a terminal such as that shown in FIG. 1A. In some embodiments, the ports 260 may be flexible ports configured to receive flexible connectors coupled with pushable connectors. The ports 260 may also be configured to receive flexible connector assemblies comprising a flexible connector coupled to a terminating connector as disclosed herein. A plate 262 has a plurality of holes corresponding to the ports on the port base 258. The plate 262 may be mounted to the port base 258 using screws and bosses and provides the undercut for a plurality of spring holders 264 to be secured. In some embodiments, the plate 262 may be molded with the port base 258. The ports 260 may protrude from the holes on the plate 262. The spring holders 264 are configured to center on the flexible connector core, and may be interchangeable. The spring holders 264 are configured to receive and hold the adapters 256. The plate 262 may be mounted onto the port base 258 so as to allow securing of the holders 264 for mounting the adapters 256 at the ports. Alternatively, plate 262 may be removed and adapters may be placed within the terminal as shown in FIG. 1A for use with pushable connectors.

Figure 23A:
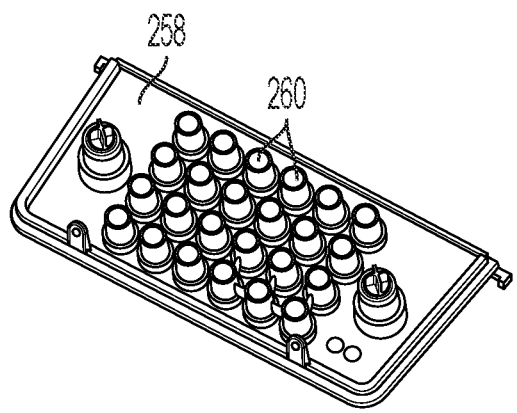
Figure 23B:
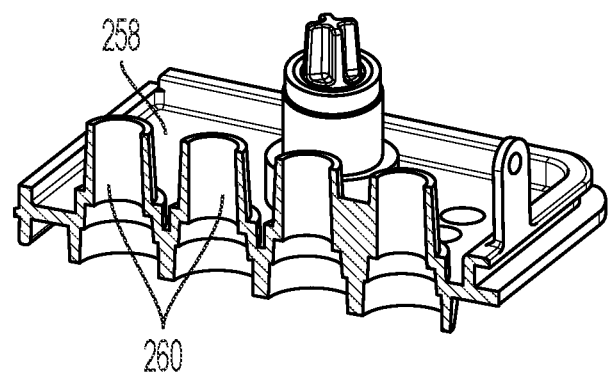

FIGS. 23A and 24B are perspective and cross-sectional views of the port base 258 of FIG. 22. The port base 258 comprises a plurality of ports 260 and is configured to mount, for example, at a side of a terminal as shown in FIG. 1A. The ports 260 may be configured as flexible ports, and may be configured to receive a flexible connector accommodating a pushable connector therethrough, and also configured to receive the flexible connector coupled to a terminating connector as disclosed in various embodiments herein.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A flexible optical fiber connector assembly comprising:
   a flexible connector having a housing configured to receive an optical fiber;
   a terminating connector comprising a back post and a ferrule configured to receive the optical fiber;
   wherein the flexible connector is configured to receive at least a portion of the back post, wherein the flexible connector is configured to couple to the terminating connector via the back post, and wherein the flexible connector comprises a protrusion configured to receive a crimp ring to secure the back post of the terminating connector to the flexible connector housing.

2. The flexible optical fiber connector assembly of claim 1, wherein the terminating connector further comprises an outer housing.

3. The flexible optical fiber connector assembly of claim 2, wherein the outer housing comprises a key configured to prevent rotation of the flexible optical fiber connector assembly.

4. The flexible optical fiber connector assembly of claim 1, further comprising a crimp ring disposed around a cylindrical protrusion of the flexible connector to prevent rotation of the terminating connector relative to the flexible connector.

5. The flexible optical fiber connector assembly of claim 1, wherein the terminating connector is configured to decouple from the flexible connector to allow the flexible connector to receive a pushable connector therethrough in lieu of the terminating connector.

6. The flexible optical fiber connector assembly of claim 1, wherein the protrusion is a cylindrical section emanating from prongs of the flexible connector.

7. The flexible optical fiber connector assembly of claim 6, wherein the prongs are separated by a slit having a double-D hole therebetween, wherein the double-D hole is configured to receive at least a portion of the back post of the terminating connector.

8. The flexible optical fiber connector assembly of claim 1, wherein the terminating connector is configured to couple with the flexible connector by snap-in or latch feature.

9. The flexible optical fiber connector assembly of claim 1, wherein the terminating connector comprises a SC connector, a LC connector, or a MPO connector.

* * * * *